(12) United States Patent
Terada et al.

(10) Patent No.: US 9,624,977 B2
(45) Date of Patent: Apr. 18, 2017

(54) CYLINDRICAL ROLLER BEARING

(71) Applicants: Junichi Terada, Mie (JP); Takeshi Maeda, Mie (JP)

(72) Inventors: Junichi Terada, Mie (JP); Takeshi Maeda, Mie (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 14/433,864

(22) PCT Filed: Oct. 21, 2013

(86) PCT No.: PCT/JP2013/078446
§ 371 (c)(1),
(2) Date: Apr. 7, 2015

(87) PCT Pub. No.: WO2014/065234
PCT Pub. Date: May 1, 2014

(65) Prior Publication Data
US 2015/0275970 A1 Oct. 1, 2015

(30) Foreign Application Priority Data
Oct. 24, 2012 (JP) .................................. 2012-234693

(51) Int. Cl.
*F16C 33/60* (2006.01)
*F16C 33/58* (2006.01)
(Continued)

(52) U.S. Cl.
CPC .......... *F16C 33/585* (2013.01); *F16C 19/225* (2013.01); *F16C 19/26* (2013.01);
(Continued)

(58) Field of Classification Search
CPC ....... F16C 33/60; F16C 33/605; F16C 33/585
See application file for complete search history.

(56) References Cited

U.S. PATENT DOCUMENTS 1,068,017 A * 7/1913 Stuebner ................. F16C 19/49
384/561
1,194,043 A * 8/1916 Laycock ................. F16C 19/28
384/561
(Continued)

FOREIGN PATENT DOCUMENTS

CN 101788018 7/2010
DE 10 2010 021 046 11/2011
(Continued)

OTHER PUBLICATIONS

International Search Report issued Jan. 21, 2014 in International (PCT) Application No. PCT/JP2013/078446.
(Continued)

*Primary Examiner* — Thomas R. Hannon
(74) *Attorney, Agent, or Firm* — Wenderoth, Lind & Ponack, L.L.P.

(57) ABSTRACT

A cylindrical roller bearing includes a flanged outer race having two inwardly extending flanges. One of the flanges is a flange ring separate from the outer race and fixed to the outer race. Cylindrical rollers are mounted between the outer race and a flangeless inner race, and retained by a retainer which are located radially inwardly of the pitch circle of the cylindrical rollers. With this arrangement, it is not necessary to reduce the widths of pillars of the retainer even if the load capacity is increased by increasing the size or the number of the cylindrical rollers, so that it is possible to increase the load capacity while ensuring strength of the retainer. Also, even if the inner race is separated from the bearing, it is possible to prevent separation of the cylindrical rollers as well as the retainer, which retains the cylindrical rollers, from the outer race.

18 Claims, 8 Drawing Sheets

(51) Int. Cl.
   *F16C 43/06* (2006.01)
   *F16C 19/26* (2006.01)
   *F16C 33/46* (2006.01)
   *F16C 19/22* (2006.01)

(52) U.S. Cl.
   CPC ........ *F16C 33/4605* (2013.01); *F16C 33/586* (2013.01); *F16C 33/605* (2013.01); *F16C 43/06* (2013.01)

(56) References Cited

U.S. PATENT DOCUMENTS

| | | | | |
|---|---|---|---|---|
| 1,270,820 | A * | 7/1918 | Hart | F16C 19/22 384/559 |
| 1,338,939 | A * | 5/1920 | Laycock | F16C 19/26 384/559 |
| 1,617,660 | A * | 2/1927 | Young | F16C 19/26 384/564 |
| 1,738,984 | A * | 12/1929 | Brown | F16C 19/26 29/898.063 |
| 2,094,252 | A * | 9/1937 | Young | F16C 19/26 384/561 |
| 3,302,987 | A * | 2/1967 | Hoffmann | F16C 19/28 384/569 |
| 3,382,016 | A * | 5/1968 | Schmidt | F16C 19/466 384/575 |
| 3,420,589 | A * | 1/1969 | Williams | F16C 19/225 384/620 |
| 3,656,825 | A * | 4/1972 | Manger | F16C 19/26 384/561 |
| 4,270,815 | A * | 6/1981 | Olschewski | F16C 19/28 384/561 |
| 4,398,776 | A * | 8/1983 | Kutemeier | B21B 31/07 384/560 |
| 6,102,579 | A * | 8/2000 | Kupietz | F16C 19/26 384/572 |
| 7,220,060 | B2 * | 5/2007 | Kono | F16C 33/46 384/572 |
| 7,766,555 | B2 * | 8/2010 | Kono | F16C 19/26 384/560 |

FOREIGN PATENT DOCUMENTS

| | | |
|---|---|---|
| EP | 0 258 845 | 3/1988 |
| JP | 53-109540 | 2/1977 |
| JP | 53-53240 | 5/1978 |
| JP | 63-167118 | 7/1988 |
| JP | 09-088970 | 3/1997 |
| JP | 2001-082488 | 3/2001 |
| JP | 2008-240942 | 10/2008 |
| JP | 2008-303893 | 12/2008 |

OTHER PUBLICATIONS

Written Opinion of the International Searching Authority issued Jan. 21, 2014 in International (PCT) Application No. PCT/JP2013/078446 (with English translation).
Extended European Search Report issued Jan. 12, 2016 in corresponding European Application No. 13849482.8.
Office Action issued Sep. 21, 2016 in Chinese Application No. 201380054407.6, with English translation.
Notification of Reasons for Refusal issued Nov. 2, 2016 in Japanese Application No. 2012-234693, with partial English translation.

* cited by examiner

CYLINDRICAL ROLLER BEARING

TECHNICAL FIELD

The present invention relates to a cylindrical roller bearing used under large radial loads.

BACKGROUND ART

A wind power generator system includes a speed increasing gear for increasing the speed of a rotary shaft connected to the rotor of the windmill to drive the generator. Since relatively large radial loads tend to be applied to the torque transmission mechanism of such a wind power generator system, the rotary shaft and the torque transmission shaft in the speed increasing gear are rotatably supported by cylindrical roller bearings which are large in load capacity.

Today, it is increasingly required that cylindrical roller bearings have a long life when used under further heavier loads. This requirement is fulfilled by increasing the size of the cylindrical rollers, or increasing the number of the cylindrical rollers. However, either of the above solutions narrows the distances between the adjacent cylindrical rollers on the pitch circle of the cylindrical rollers. This makes it necessary to reduce the widths of the pillars of the retainer, which in turn raises a concern regarding the strength of the retainer.

A full type cylindrical roller bearing, i.e. a bearing having no retainer, which is disclosed in JP Patent Publication 9-88970A, is large in load capacity and is suitable for use under heavy loads. However, since this type of bearing has no retainer, its rotation properties are not good, and also, damage to the surfaces of the cylindrical rollers is concerned because the cylindrical rollers contact each other while rotating.

JP Patent Publication 2008-03893A discloses a cylindrical roller bearing of which the pillars of the retainer is located radially inwardly or radially outwardly of the pitch circle of the cylindrical rollers. By locating the pillars of the retainer offset from the pitch circle of the cylindrical rollers. As a result, it is possible to increase the size of the cylindrical rollers or increase the number of the cylindrical rollers, which in turn makes it possible to increase the load capacity of the cylindrical roller bearing while maintaining good rotation properties.

The cylindrical roller bearing disclosed in JP Patent Publication 2008-03893A includes a bearing race having two flanges, and a bearing race having one flange. Since the retainer is disposed between these bearing races so as to be offset from the pitch circle of the cylindrical rollers toward the bearing race with two flanges, if the bearing race with a single flange is separated from the bearing, the cylindrical rollers are also separated such that the bearing becomes completely disassembled. Thus, it is extremely troublesome to assemble this cylindrical roller bearing.

In order to prevent separation of the bearing race with a single flange, it is necessary to mount a snap ring at the end of a cylindrical raceway of the bearing race with a single flange. However, since a snap ring is insufficient in strength, it is difficult to guide the end surfaces of the rollers with a snap ring.

SUMMARY OF THE INVENTION

An object of the present invention is to provide a cylindrical roller bearing which is large in load capacity, while keeping sufficient strength of the retainer, and which can be assembled easily and also can be easily mounted to another member.

In order to achieve this object, the present invention provides a cylindrical roller bearing comprising an outer race formed with a cylindrical raceway on an inner periphery of the outer bearing race, an inner race formed with a cylindrical raceway on an outer periphery of the inner race, a plurality of cylindrical rollers disposed between the inner race and the outer race, and a cylindrical retainer formed with circumferentially spaced apart pockets which are equal in number to the cylindrical rollers and in which the respective cylindrical rollers are rotatably received. A first one of the outer race and the inner race is a flanged bearing race having a first flange configured to guide first end surfaces of the respective cylindrical rollers, and a second flange configured to guide second end surfaces of the respective cylindrical rollers, and a second one of the outer race and the inner race is a flangeless bearing race having no flanges. The retainer includes pillars defined between the respective adjacent pairs of the pockets and located between the pitch circle of the cylindrical rollers and the raceway of the flangeless bearing race. At least one of the first and second flanges comprises a flange ring which is a separate member from, and fixed to, the flanged bearing race, and the flange ring is fixed to the flanged bearing race after fitting the cylindrical rollers in the flanged bearing race.

In this cylindrical roller bearing, by fitting the retainer, with the cylindrical rollers fitted in the pockets of the retainer, to the flanged bearing race, to which the flange ring is not yet mounted, and then by fixing the flange ring, the cylindrical rollers and the retainer are inseparably held by the flanged bearing race. In this state, by mounting the flangeless bearing race, the cylindrical roller bearing is assembled.

The cylindrical roller bearing can thus be easily assembled. Once the bearing is assembled, even if the flangeless bearing is separated, the flanged bearing race, the retainer, and the cylindrical rollers remain assembled and inseparable. This subassembly can thus be easily mounted to a shaft or a housing.

Since the pillars of the retainer, which are defined between the adjacent pockets of the retainer, are located between the pitch circle of the cylindrical rollers and the cylindrical raceway of the flangeless bearing race, it is possible to increase the size or the number of the cylindrical rollers while maintaining sufficient strength of the pillars of the retainer. It is therefore possible to increase the load capacity of the cylindrical roller bearing while maintaining sufficient strength of the retainer.

By locating the pillars of the retainer radially offset from the pitch circle of the cylindrical rollers, radial movement of the cylindrical rollers decreases, which makes it possible to dispense with lead-in chamfers at both axial ends of the raceway of the flangeless bearing race. By dispensing with the lead-in chamfers, it is possible to increase the distance by which the flanged bearing race and the flangeless bearing race can move axially relative to each other.

The flange ring of the cylindrical roller bearing according to the present invention can be fixed to the bearing race by tightening bolts, by pins, by fitting annular fastening members in annular grooves each formed partially in the peripheral surface of the flanged bearing race and partially in the peripheral surface of the flange ring so as to bridge them when the flange ring is brought into abutment with the end surface of the flanged bearing race, by welding, by bringing the flange ring itself into threaded engagement with a thread formed on the peripheral surface of the flanged bearing race at one end thereof and tightening the flange ring, or by press-fitting the flange ring itself onto the peripheral surface of the flanged bearing race at one end thereof.

If the flange ring is to be fixed in position by tightening bolts, the bolts may be inserted through axial bolt inserting holes formed in the flange ring and driven into threaded holes formed in the end surface of the flanged bearing race. Alternatively, means for fixing the flange using bolts comprises a small-diameter cylindrical surface provided at the axial end of the flanged bearing race and formed with radial bolt inserting holes, a cylindrical portion provided on the flange ring and fitted on the small-diameter cylindrical surface, the cylindrical portion being formed with radial threaded holes, and bolts, and is configured such that the bolts can be inserted through the bolt inserting holes, and driven into the threaded holes.

If pins are used to fix the flange ring in position, the flange ring can be fixed to the flanged bearing race by pin holes extending through the flange ring and into the flanged bearing race, and pins press-fitted in the pin holes. Alternatively, the flange ring and bearing race can be fixed by a cylindrical portion provided on the flange ring and fitted to the end of the flanged bearing race, pin holes extending from the peripheral surface of the cylindrical portion through the cylindrical portion, and into the flanged bearing race, and pins press-fitted in the pin holes.

If the flange ring is fixed to the flanged bearing race by press-fitting, the flanged bearing race could be radially deformed when the flange ring is press-fitted, and the thus deformed flanged bearing race could make it difficult to mount the bearing to a housing or a shaft. In order to reduce such radial deformation of the flanged bearing race, an annular groove is preferably formed in the end surface of the flanged bearing race.

By forming the retainer by pressing or from a synthetic resin, it can be manufactured at a lower cost than when the retainer is formed by machining.

By guiding the retainer with the cylindrical rollers, it is possible to reduce resistance to rotation of the bearing compared to when the retainer is guided by a raceway.

ADVANTAGES OF THE INVENTION

According to the present invention, since the pillars of the retainer which are defined between the adjacent pockets of the retainer are located between the pitch circle of the cylindrical rollers and the cylindrical raceway of the flangeless bearing race, it is possible to increase the size or the number of the cylindrical rollers, and thus to increase the load capacity of the bearing, while maintaining sufficient strength of the pillars.

By fitting the subassembly of the retainer and the cylindrical rollers fitted in the pockets of the retainer to the flanged bearing race before the flange ring is mounted thereto, and then fixing the flange ring to the flanged bearing race, the flanged bearing race, the retainer and the cylindrical rollers remain assembled, and the subassembly thereof can be easily mounted to a shaft or a housing. Also, by mounting this subassembly to the flangeless bearing race, it is possible to form a cylindrical roller bearing. Such a cylindrical roller bearing can be easily assembled.

DETAILED DESCRIPTION OF THE INVENTION

Figure 1:
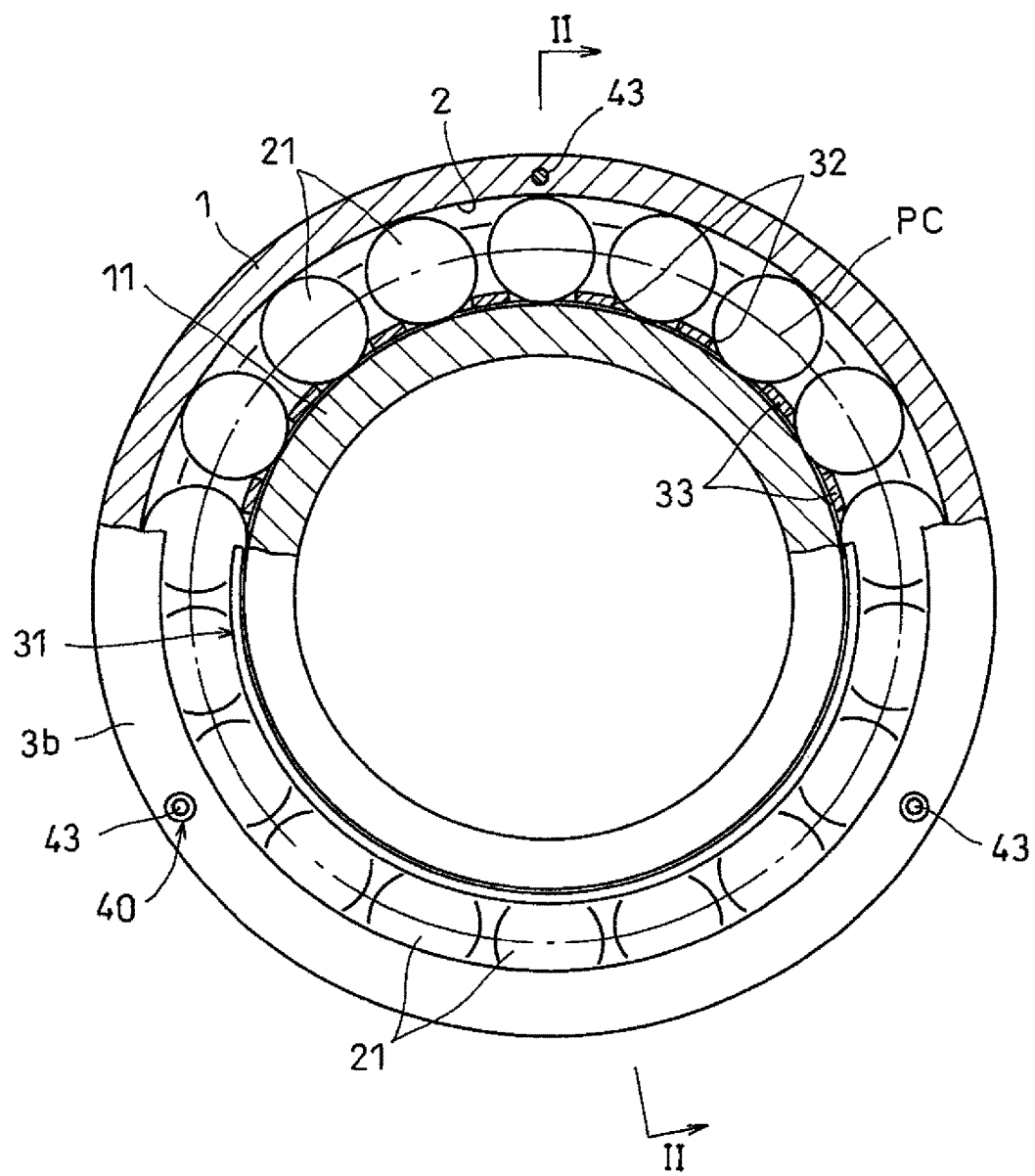
FIG. 1 is a partially cutaway front view of a cylindrical roller bearing embodying the present invention.
Figure 2:
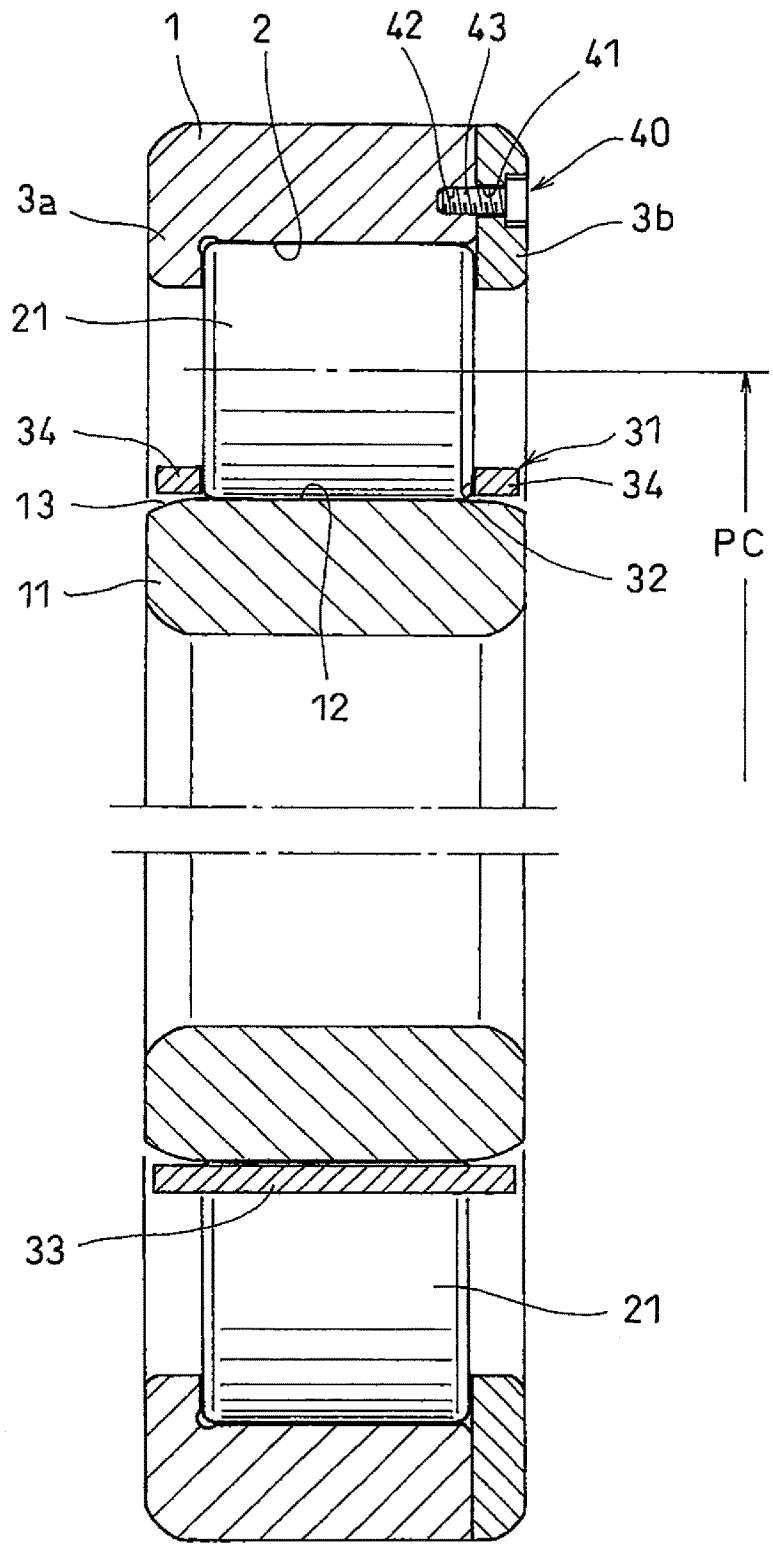
FIG. 2 is a sectional view taken along line II-II of FIG. 1.

The embodiment of the present invention is now described. As shown in FIGS. 1 and 2, the cylindrical roller bearing of the embodiment includes a flanged outer bearing race 1 (hereinafter simply referred to as "outer race 1") having two flanges at the respective axial ends thereof, and a flangeless inner bearing race 11 (hereinafter simply referred to as "inner race 11"). A plurality of cylindrical rollers 21 are mounted between the outer race 1 and the inner race 11, and retained by a retainer 31.

The outer race 1 has a cylindrical raceway 2 on the inner periphery thereof. The two flanges 3a and 3b extend inwardly at the respective axial ends of the raceway 2, and are configured to guide the end surfaces of the cylindrical rollers 21.

Of the two inwardly extending flanges 3a and 3b, the flange 3a is integral (one piece) with the outer race 1, while the flange 3b comprises a flange ring 3b which is a separate member from the outer race 1. The flange ring 3b has an outer diameter equal to or slightly smaller than the outer diameter of the outer race 1, and has an inner diameter equal to the inner diameter of the flange 3a. The flange ring 3b is brought into abutment with the end surface of the outer race 1, and then fixed to the outer race 1 by a fixing arrangement 40.

As shown in FIG. 2, the fixing arrangement 40 comprises axial bolt inserting holes 41 formed in the flange ring 3b and having countersunk portions, threaded holes 42 formed in the end surface of the outer race 1 so as to face the respective bolt inserting holes 41, and bolts 43. By inserting the bolts 43 through the respective bolt inserting holes 41, then driving the bolts 43 into the respective threaded holes 42, and tightening the bolts 43, the flange ring 3b is fixed to the outer race 1. If the number of bolts 43 is too few, it is difficult to stably fix the flange ring 3b in position. It is therefore necessary to use three or more bolts 43, and tighten the portions of the flange ring 3b circumferentially equidistantly spaced apart from each other with the bolts 43.

The inner race 11 has a cylindrical raceway 12 on its outer periphery, and lead-in chamfers 13 at the respective axial ends of the raceway 12. The cylindrical rollers 21 can roll along the raceway 12 as well as along the raceway 2 of the outer race 1.

The retainer 31 is a cylindrical member formed with pockets 32 which are equal in number to the cylindrical rollers 21 and circumferentially spaced apart from each other. The cylindrical rollers 21 are received in the respective pockets 32.

The pitch circle diameter PCD of the retainer 31 is the centerline diameter of the circular arrangement of the pillars 33 of the retainer 31. The retainer 31 has an outer diameter smaller than the pitch circle diameter PCD of the cylindrical rollers 21. Thus the retainer 31 is configured so that pitch circle diameter of the retainer 31 is located between the pitch circle PC and the raceway 12 of the inner (flangeless) race 11. The retainer 31 includes pillars 33 defined between the adjacent pockets 32, and ring portions 34 provided at the respective first and second opposed ends of the pillars 33, and is arranged such that the inner peripheral surfaces of the pillars 33 and the inner peripheral surfaces of the ring portions 34 are guided by the raceway 12 of the inner race 11.

The retainer 31 may be formed by machining. However, since machining is costly, the retainer 31 of the embodiment is formed by pressing metal for reduced cost. Instead of by pressing metal, however, the retainer 31 may be formed of synthetic resin.

In assembling the cylindrical roller bearing of the embodiment, the cylindrical rollers 21 are fitted in the respective pockets 32 of the retainer 31 from radially outside the retainer 31, and the subassembly of the retainer 31 and the cylindrical rollers 21 is then fitted in the outer race 1. In this state, with the flange ring 3b in abutment with the end surface of the outer race 1, the bolts 43 are inserted through the bolt inserting holes 41 formed in the flange ring and driven into the threaded holes 42, thereby fixing the flange ring 3b to the outer race 1.

With the flange ring 3b fixed in position, the flange ring 3b and the flange 3a prevent axial separation of the cylindrical rollers 21 from the bearing, while the retainer 31 prevents separation of the cylindrical rollers 21 in the radially inward direction. Thus in this state, the outer race 1, the cylindrical rollers 21, and the retainer 31 remain assembled together. By inserting the inner race 11 into the subassembly of the outer race, cylindrical rollers and retainer, the cylindrical roller bearing is assembled.

As described above, by fitting the subassembly of the retainer 31 and the cylindrical rollers 21 into the outer race 1, and then by fixing the flange ring 3b to the outer race 1, the outer race 1, the cylindrical rollers 21 and the retainer 31 are inseparably assembled together. Thus, by inserting the inner race 11 into the subassembly of the outer race 1, cylindrical rollers and retainer, the cylindrical roller bearing can be easily assembled. Also, since the cylindrical rollers 21 are simply inserted into the pockets 32 of the retainer 31 and not forcibly pushed into the pockets 32, the retainer 31 will never be deformed and the cylindrical rollers 21 will not be damaged, when assembling the cylindrical roller bearing.

Even if the inner race 11 is axially separated from the outer race 1, the retainer 31, and the cylindrical rollers 21, the latter remain inseparably assembled together, so that the latter can be easily mounted on a shaft or in a housing.

With the cylindrical roller bearing assembled as shown in FIGS. 1 and 2, since the pillars 33 of the retainer 31, which are defined between the adjacent pockets 32, are arranged inside the pitch circle PC of the cylindrical rollers 21, even if the size and/or number of the cylindrical rollers 21 is increased, the pillars 33 of the retainer 31 maintain sufficient strength. In other words, with this arrangement, it is possible to increase the load capacity of the cylindrical roller bearing while maintaining sufficient strength of the retainer 31.

Figure 3:
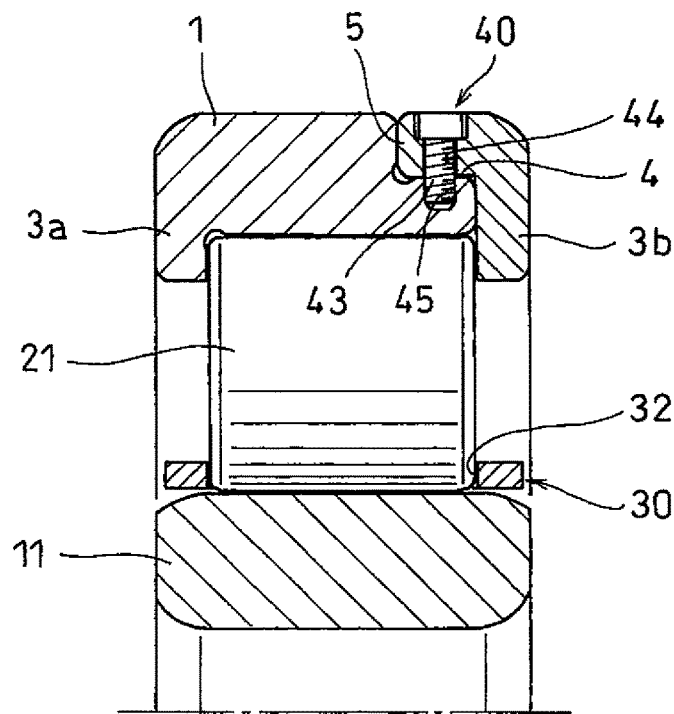
FIG. 3 is a sectional view showing a different means for fixing a flange ring.

In FIG. 2, in order to fix the flange ring 3b to the outer race 1, the bolts 43 are inserted through the axial bolt inserting holes 41 formed in the flange ring 3b, brought into threaded engagement with the threaded holes 42 formed in the end surface of the outer race 1, and tightened. In FIG. 3, the (flanged) outer race 1 has at its axial end portion a small-diameter cylindrical surface 4 having a diameter smaller than the outer diameter of the remaining portion of the outer race 1 and formed with radial threaded holes 45, while the flange ring 3b has a cylindrical portion 5 fitted on the small-diameter cylindrical surface 4 and formed with radial bolt inserting holes 44 having countersunk portions. In order to fix the flange ring 3b of FIG. 3 to the outer race 1, bolts 43 are inserted through the radial bolt inserting holes 44, driven into the radial threaded holes 45 formed in the small-diameter cylindrical surface 4, and tightened.

The fixing arrangement 40 of FIG. 3, for fixing the flange ring 3b, is free of the problem of separation of any of the bolts 43 in the radially outward direction even if the bolt 43 loosens, because the outer race 1 is ordinarily mounted in a housing. Therefore, this arrangement reliably prevents separation of the flange ring 3b, as well as radial displacement of the flange ring 3b.

In FIGS. 2 and 3, the flange ring 3b is fixed in position by tightening the bolts 43 of the fixing arrangement 40. The fixing arrangement 40 of the present invention is however not limited to this type. FIGS. 4 to 9 show different fixing arrangement 40.

Figure 4:
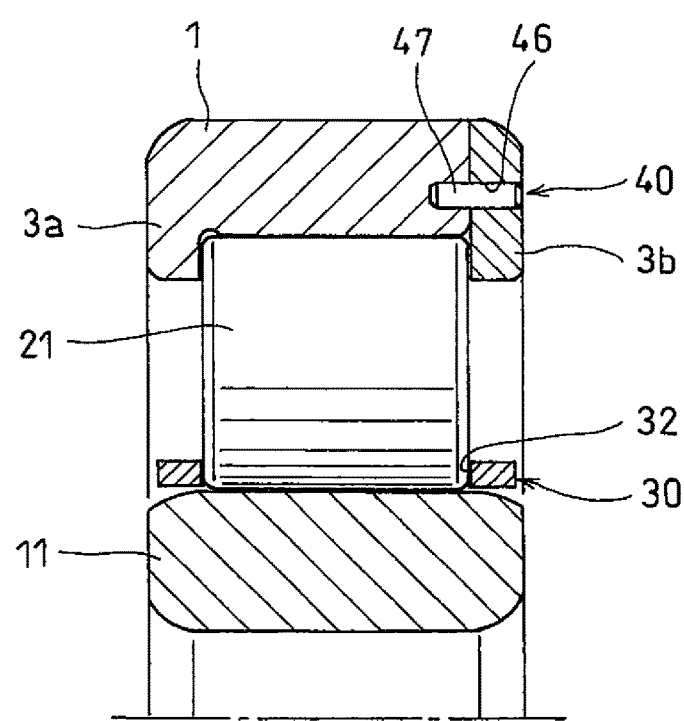
FIG. 4 is a sectional view showing a still different means for fixing the flange ring.

The fixing arrangement 40 shown in FIG. 4 comprises axial pin holes 46 formed in the flange ring 3b and the outer race 1, and pins 47 press-fitted in the pin holes 46 to fix the flange ring 3b in position.

A fixing arrangement as a modification of the fixing arrangement 40 of FIG. 4 may comprise radial pin holes extending through the cylindrical portion 5 shown in FIG. 3 and into the outer race 1, and pins press-fitted in these radial pin holes to fix the flange ring 3b in position.

The holes of the fixing arrangement 40 of FIG. 4, namely, the pin holes 46 formed in the flange ring 3b and the outer race 1 can be formed by drilling, so that these pin holes can be formed more easily than the holes of the fixing arrangement 40 of FIG. 3, because the fixing arrangement of FIG. 4 includes threaded holes.

Figure 5:
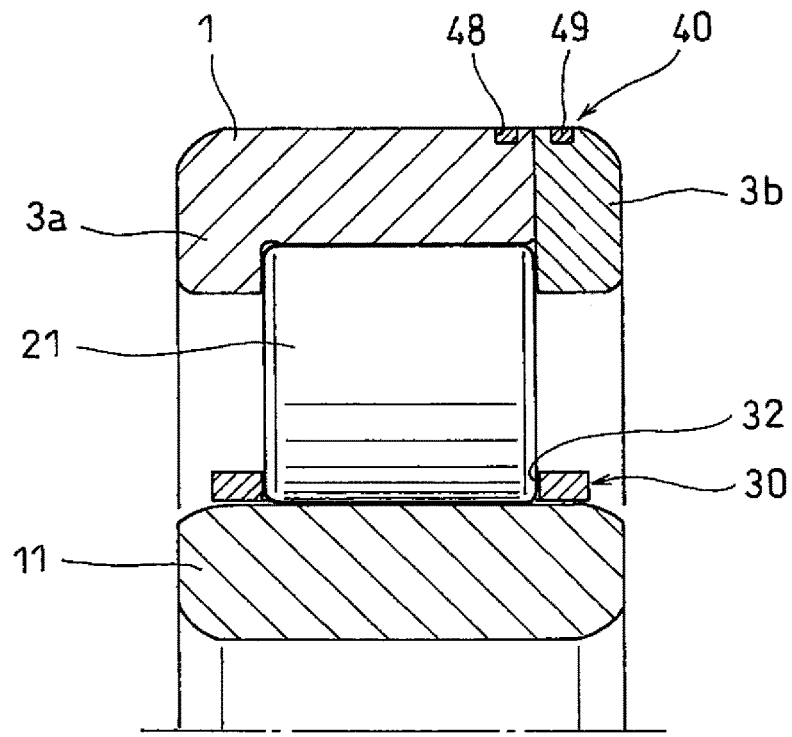
FIG. 5 is a sectional view showing a further different means for fixing the flange ring.
Figure 6:
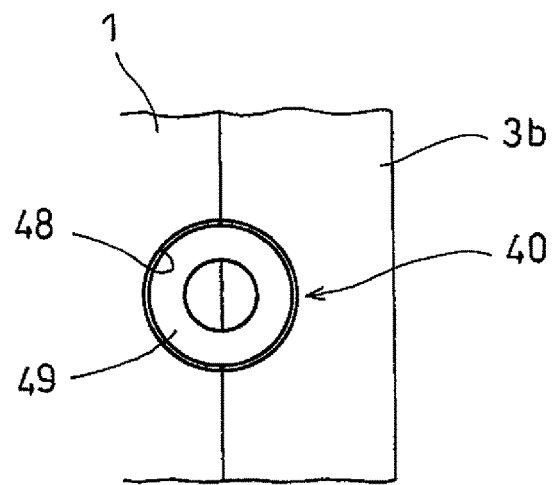
FIG. 6 is a plan view of a portion where the flange ring of FIG. 5 is fixed.

The bearing of FIGS. 5 and 6 has the flange ring 3b in abutment with the end surface of the outer race 1. The fixing arrangement 40 of FIGS. 5 and 6 includes a plurality of circumferentially spaced apart annular grooves 48 each formed partially in the radially outer surface of the outer race 1 and partially in the radially outer surface of the flange ring 3b so as to bridge the abutment line between the outer race 1 and the flange ring 3b. The fixing arrangement 40 of FIGS. 5 and 6 further includes annular fastening members 49 each fitted in a respective one of the annular grooves 48. The fastening members 49 may be simply fitted in the respective annular grooves 48, or press-fitted in the annular grooves 48. Or instead of press-fitting, the fastening members 49 may be fixed in the grooves 48 by adhesive bonding. The fastening members 49 may be further caulked to more reliably prevent separation.

Since the annular grooves 48 which bridge the outer race 1 and the flange ring 3b can be formed by cutting, the fixing arrangement 40 shown in FIGS. 5 and 6 can be formed more easily than the fixing arrangement 40 including the threaded holes. Also, the fixing arrangement 40 of FIGS. 5 and 6 can more strongly fix together the outer race 1 and the flange ring 3*b*.

Figure 7:
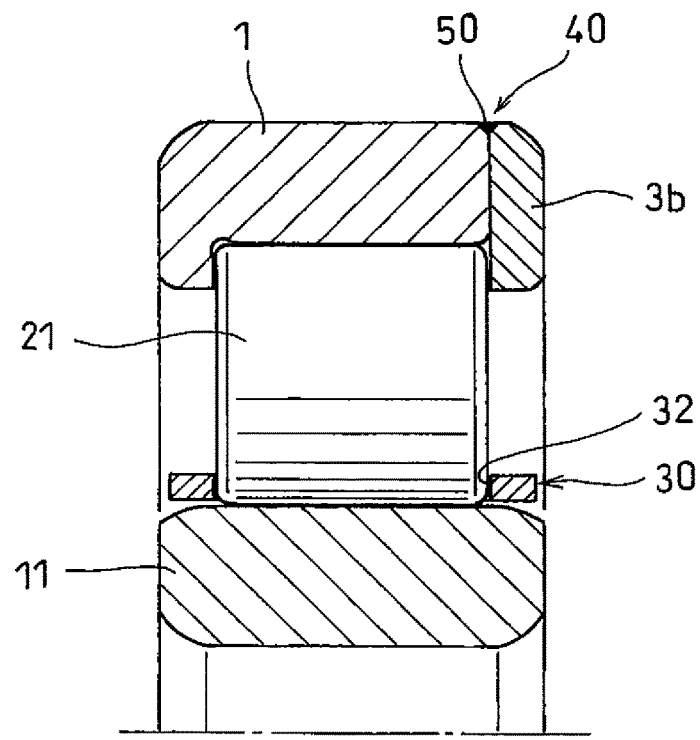
FIG. 7 is a sectional view showing a still different means for fixing the flange ring.

In FIG. 7, as the fixing arrangement 40 for fixing together the outer race 1 and the flange ring 3*b*, the flange ring 3*b* is brought into abutment with the end surface of the outer race 1, and the abutment surfaces are welded together at the outer peripheral portions thereof, as shown by weld joint 50 in FIG. 7.

By using the fixing arrangement 40 of FIG. 7, which comprises welding, it is possible to reduce the number of parts of the bearing compared to the bearing which uses the fixing arrangement 40 including bolts or pins. The fixing arrangement 40 of FIG. 7 is also inexpensive because it needs neither threaded holes nor pin holes.

Figure 8:
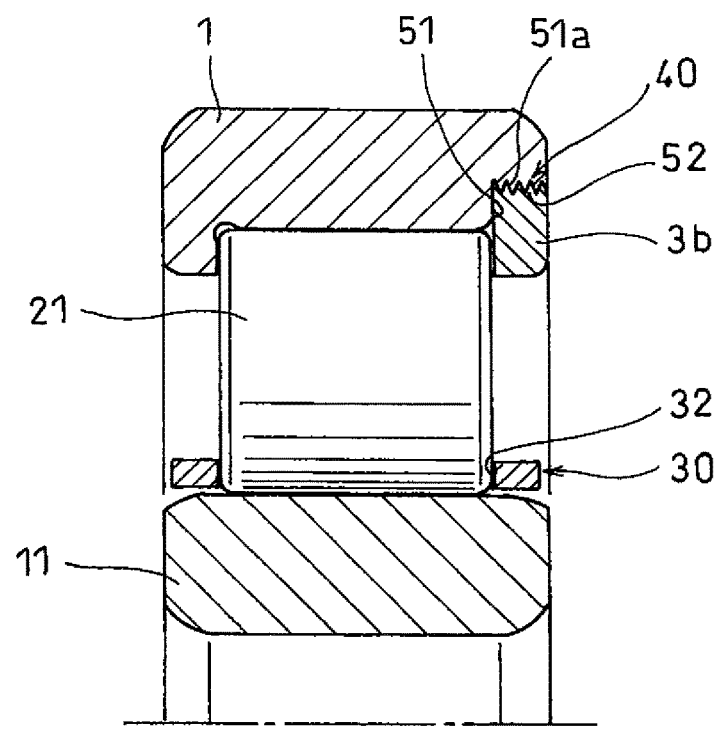
FIG. 8 is a sectional view showing a still different means for fixing the flange ring.

The fixing arrangement 40 shown in FIG. 8 includes a fitting recess comprising a threaded hole 51 formed in the end surface of the outer race 1, and an external thread 52 formed on the outer periphery of the flange ring 3*b*. The external thread 52 is in threaded engagement with the internal thread 51*a* of the threaded hole 51 with the flange ring 3*b* driven into the threaded hole 51 until the flange ring 3*b* abuts the closed end surface of the threaded hole 51.

Figure 9:
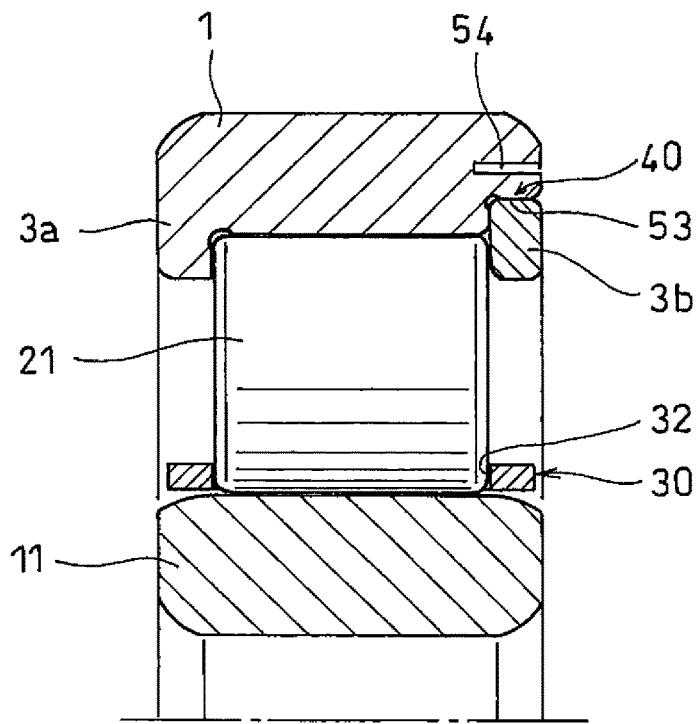
FIG. 9 is a sectional view showing a further different means for fixing the flange ring.

The fixing arrangement 40 shown in FIG. 9 includes a fitting recess 53 formed in the end surface of the outer race 1, having a diameter larger than the inner diameter of the outer race 1, and in which the flange ring 3*b* is press-fitted. When the flange ring 3*b* is press-fitted, the outer race 1 could be radially outwardly deformed. To prevent such deformation, the outer race 1 is formed, in the end surface thereof, with an annular groove 54.

The fixing arrangement 40 of FIG. 9 can be formed more easily than the fixing arrangement 40 of FIG. 8 because the former requires no threads as required in the latter.

Figure 10:
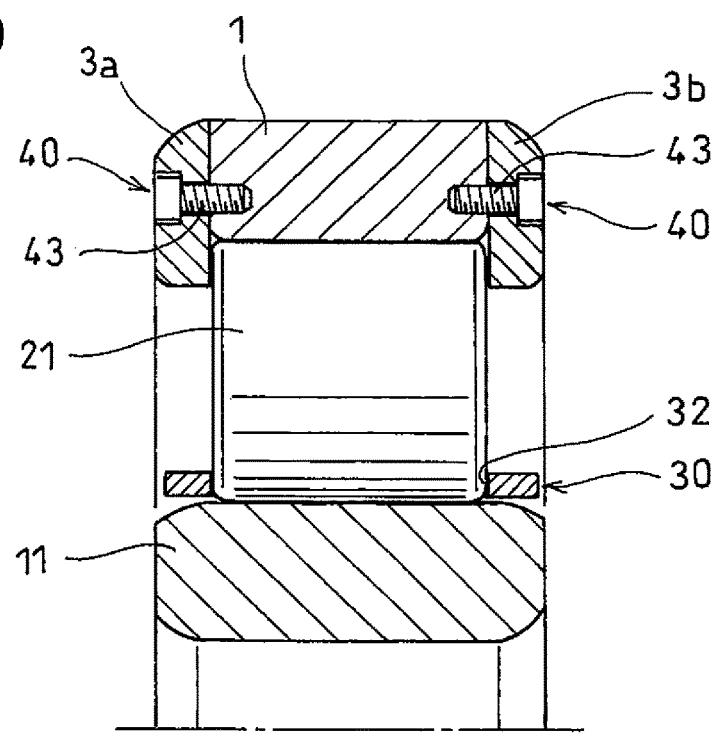
FIG. 10 is a sectional view showing a different flanged bearing race having two flanges.

In FIGS. 2 to 9, of the two inwardly extending flanges 3*a* and 3*b* of the outer race 1, only the flange 3*b* comprises the flange ring 3*b* separate from the outer race 1 and fixed to the outer race 1. As shown in FIG. 10, however, both of the inwardly extending flanges 3*a* and 3*b* may comprise flange rings separate from the outer race 1 and fixed to the outer race 1. In FIG. 10, each flange ring is fixed to the outer race by the same fixing arrangement 40 as shown in FIG. 2, which uses bolts. However, any of the fixing arrangement 40 shown in FIGS. 3 to 9 may be used instead.

By using flange rings for both of the two inwardly extending flanges 3*a* and 3*b* as shown in FIG. 10, it is possible to simplify the shape of the outer race 1.

Figure 11:
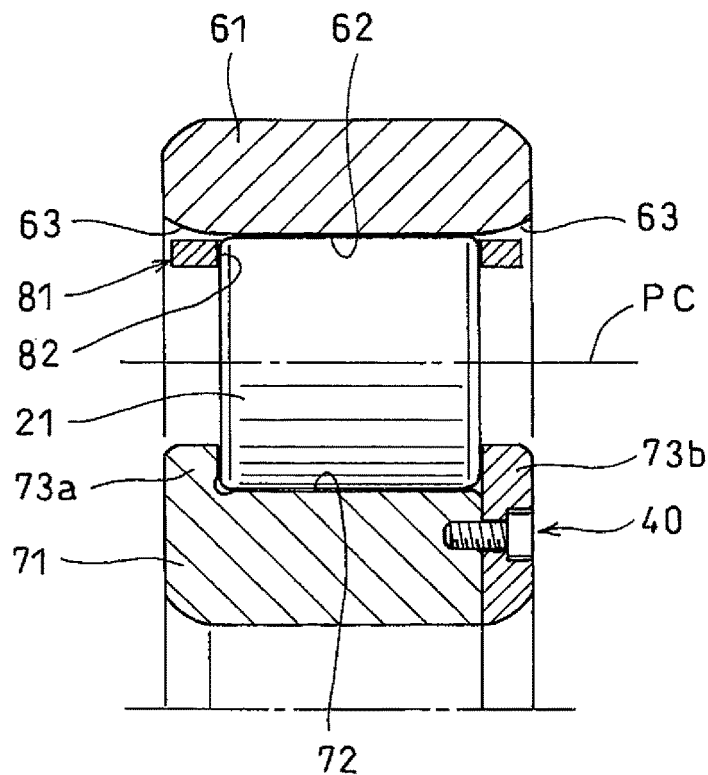
FIG. 11 is a sectional view of a cylindrical roller bearing according to another embodiment of the present invention.

FIG. 11 shows a different cylindrical roller bearing embodying the present invention. In this embodiment, the outer race 61 has no flanges, and is formed with lead-in chamfers 63 on the respective axial ends of a cylindrical raceway 62 formed on the inner periphery of the outer race 61.

The inner race 71 includes outwardly extending flanges 73*a* and 73*b* provided at the respective axial ends of a cylindrical raceway 72 formed on the outer periphery of the inner race 71. The flange 73*b* comprises a flange ring separate from and fixed to the inner race 71.

The cylindrical rollers 21 are retained by a retainer 81 located radially outwardly of the pitch circle diameter PCD of the cylindrical rollers 21 so as to be guided by the raceway 62 of the outer race 61. In particular, the inner diameter of the retainer 81 is larger than the pitch circle diameter PCD of rollers 21. Numeral 82 in FIG. 11 indicates pockets formed in the retainer 81 in which the respective cylindrical rollers 21 are received.

Since the retainer 81 of the cylindrical roller bearing shown in FIG. 11 is also not located on the pitch circle PC, it is possible to increase the size and/or number of the cylindrical rollers 21 while maintaining sufficient strength of the retainer 81. In other words, with this arrangement, it is possible to increase the load capacity of the cylindrical roller bearing while maintaining sufficient strength of the retainer 81.

In this arrangement, even if the outer race 61 separates from the bearing, the cylindrical rollers 21 do not separate, and the cylindrical rollers 21 and the retainer 81 remain mounted to the inner race 71. The subassembly of the cylindrical rollers 21, the retainer 81 and the inner race 71 can thus be easily mounted on a shaft, and also, the cylindrical roller bearing can be easily assembled.

In FIG. 11, only the outwardly extending flange 73*b* comprises the flange ring. However, the other outwardly extending flange 73*a* may also comprise a flange ring fixed to the inner race 71.

In FIG. 11, the flange ring 73*b* is fixed to the outer race by the same fixing arrangement 40 as shown in FIG. 2, which uses bolts. However, any of the fixing arrangement 40 shown in FIGS. 3 to 9 may be used instead.

Figure 12:
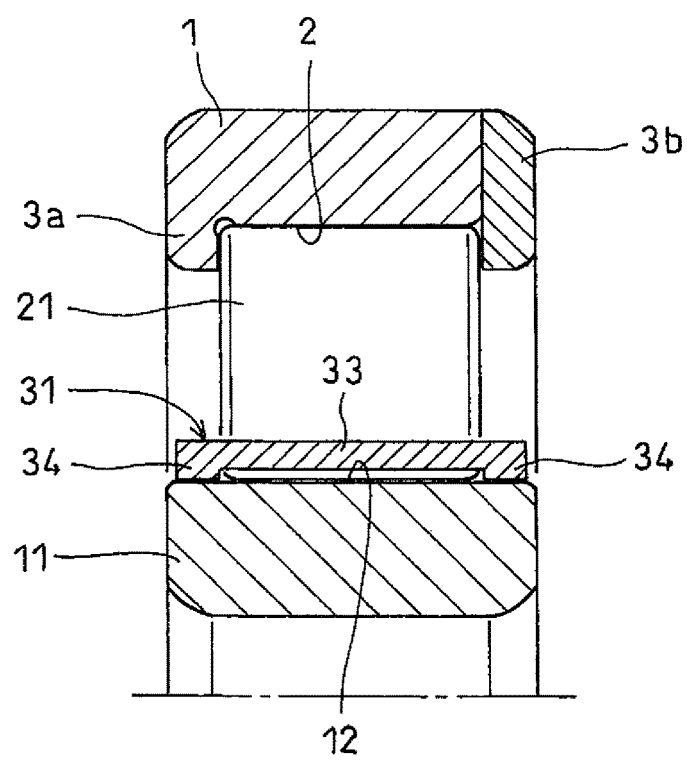
FIG. 12 is a sectional view showing a different retainer.

In the embodiment shown in FIG. 12, the retainer 31 is uniform in thickness over the entire axial length thereof. As shown in FIG. 12, however, the ring portions 34 may have smaller inner diameters than the inner diameters of the pillars 33 such that the ring portions 34 are larger in wall thickness than the pillars 33.

With the arrangement in which the ring portions 34 are larger in wall thickness than the pillars 33, it is possible to keep the pillars 33 out of contact with the raceway 12 of the inner race 11. This reduces wear of the raceway 12 and also reduces resistance to rotation of the cylindrical roller bearing.

By retaining the cylindrical rollers 21 with the retainer 31 as shown in FIGS. 2 and 12, it is possible to reduce radial movements of the cylindrical rollers, which in turn eliminates the necessity for the lead-in chamfers 13.

Figure 13:
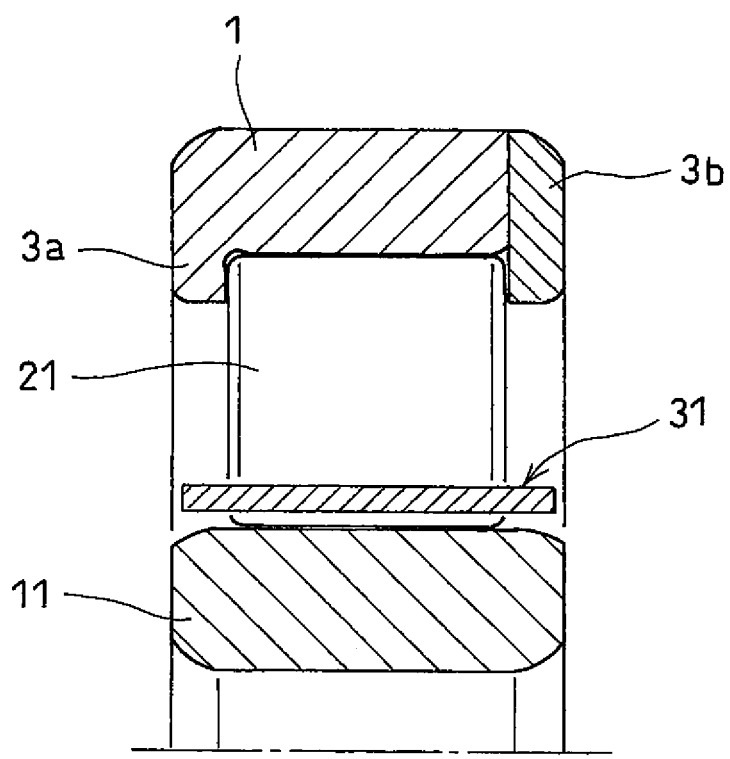
FIG. 13 is a sectional view showing a still different retainer.

In the embodiment shown in FIG. 2, the retainer 31 is guided by the inner race, as described above. However, the retainer 31 may be guided by the cylindrical rollers 21 as shown in FIG. 13. By guiding the retainer 31 with the rollers, it is possible to keep the retainer 31 out of contact with the inner race 11, thus reducing wear of the raceway 11 and also reducing rotational resistance and thus torque loss.

DESCRIPTION OF THE NUMERALS

1. Outer (bearing) race
2. Raceway
3*a*. Inwardly extending flange
3*b*. Inwardly extending flange (flange ring)
4. Small-diameter cylindrical surface
5. Cylindrical portion
11. Inner (bearing) race
12. Raceway
21. Cylindrical roller
31. Retainer
32. Pocket
33. Pillar
34. Ring portion
40. Fixing means
41. Bolt inserting hole
42. Threaded hole
43. Bolt
44. Bolt inserting hole 45. Threaded hole
46. Pin hole
47. Pin
48. Annular groove
49. Fastening member
50. Welded portion
53. Fitting recess
54. Annular groove
61. Outer (bearing) race
62. Raceway
71. Inner (bearing) race
72. Raceway
73a. Outwardly extending flange
73b. Outwardly extending flange (flange ring)
81. Retainer
82. Pocket

What is claimed is:

1. A cylindrical roller bearing comprising an outer race formed with a cylindrical raceway on an inner periphery of the outer race, an inner race formed with a cylindrical raceway on an outer periphery of the inner race, a plurality of cylindrical rollers disposed between the inner race and the outer race, and a cylindrical retainer formed with circumferentially spaced apart pockets which are equal in number to the cylindrical rollers and in which the respective cylindrical rollers are rotatably received,
wherein a first one of the outer race and the inner race is a flanged bearing race having a first flange configured to guide first end surfaces of the respective cylindrical rollers, and a second flange configured to guide second end surfaces of the respective cylindrical rollers, and a second one of the outer race and the inner race is a flangeless bearing race having no flanges,
wherein the retainer includes pillars defined between the respective adjacent pairs of the pockets, the retainer being configured such that the pillars are located between a pitch circle of the cylindrical rollers and the raceway of the flangeless bearing race and such that the pillars do not exist on the pitch circle of the cylindrical rollers,
wherein at least one of the first flange and the second flange comprises a flange ring which is a separate member from, and fixed to, the flanged bearing race, and the flange ring is configured to be fixed to the flanged bearing race after fitting the cylindrical rollers in the flanged bearing race, and
wherein the flange ring is fixed to the flanged bearing race by a fixing arrangement comprising a small-diameter cylindrical surface provided at an axial end of the flanged bearing race and formed with a radial threaded hole, a cylindrical portion provided on the flange ring and fitted on the small-diameter cylindrical surface, said cylindrical portion being formed with a radial bolt inserting hole, and a bolt, and wherein said fixing arrangement is configured such that the bolt can be inserted through the bolt inserting hole, driven into the threaded hole and tightened, thereby fixing the flange ring to the flanged bearing race.

2. The cylindrical roller bearing of claim 1, wherein the retainer has an outer diameter smaller than a pitch circle of the cylindrical rollers.

3. The cylindrical roller bearing of claim 2, wherein the outer diameter of the retainer is located between the pitch circle of the cylindrical rollers and the raceway of the flangeless bearing race.

4. The cylindrical roller bearing of claim 1, wherein the retainer has an inner diameter larger than a pitch circle of the cylindrical rollers.

5. The cylindrical roller bearing of claim 4, wherein the inner diameter of the retainer is located between the pitch circle of the cylindrical rollers and the raceway of the flangeless bearing race.

6. The cylindrical roller bearing of claim 1, wherein the retainer is configured such that a pitch circle diameter of the retainer is located between a pitch circle of the cylindrical rollers and the raceway of the flangeless bearing race.

7. A cylindrical roller bearing comprising an outer race formed with a cylindrical raceway on an inner periphery of the outer race, an inner race formed with a cylindrical raceway on an outer periphery of the inner race, a plurality of cylindrical rollers disposed between the inner race and the outer race, and a cylindrical retainer formed with circumferentially spaced apart pockets which are equal in number to the cylindrical rollers and in which the respective cylindrical rollers are rotatably received,
wherein a first one of the outer race and the inner race is a flanged bearing race having a first flange configured to guide first end surfaces of the respective cylindrical rollers, and a second flange configured to guide second end surfaces of the respective cylindrical rollers, and a second one of the outer race and the inner race is a flangeless bearing race having no flanges,
wherein the retainer includes pillars defined between the respective adjacent pairs of the pockets, the retainer being configured such that the pillars are located between a pitch circle of the cylindrical rollers and the raceway of the flangeless bearing race and such that the pillars do not exist on the pitch circle of the cylindrical rollers,
wherein at least one of the first flange and the second flange comprises a flange ring which is a separate member from, and fixed to, the flanged bearing race, and the flange ring is configured to be fixed to the flanged bearing race after fitting the cylindrical rollers in the flanged bearing race, and
wherein the flange ring is fixed to the flanged bearing race by a fixing arrangement comprising a small-diameter cylindrical surface provided at an axial end of the flanged bearing race, a cylindrical portion provided on the flange ring and fitted on the small-diameter cylindrical surface, a pin hole extending from a peripheral surface of the cylindrical portion through the cylindrical portion, and into the flanged bearing race, and a pin press-fitted in the pin hole.

8. The cylindrical roller bearing of claim 7, wherein the retainer has an outer diameter smaller than a pitch circle of the cylindrical rollers.

9. The cylindrical roller bearing of claim 8, wherein the outer diameter of the retainer is located between the pitch circle of the cylindrical rollers and the raceway of the flangeless bearing race.

10. The cylindrical roller bearing of claim 7, wherein the retainer has an inner diameter larger than a pitch circle of the cylindrical rollers.

11. The cylindrical roller bearing of claim 10, wherein the inner diameter of the retainer is located between the pitch circle of the cylindrical rollers and the raceway of the flangeless bearing race.

12. The cylindrical roller bearing of claim 7, wherein the retainer is configured such that a pitch circle diameter of the retainer is located between a pitch circle of the cylindrical rollers and the raceway of the flangeless bearing race.

13. A cylindrical roller bearing comprising an outer race formed with a cylindrical raceway on an inner periphery of the outer race, an inner race formed with a cylindrical raceway on an outer periphery of the inner race, a plurality of cylindrical rollers disposed between the inner race and the outer race, and a cylindrical retainer formed with circumferentially spaced apart pockets which are equal in number to the cylindrical rollers and in which the respective cylindrical rollers are rotatably received, wherein a first one of the outer race and the inner race is a flanged bearing race having a first flange configured to guide first end surfaces of the respective cylindrical rollers, and a second flange configured to guide second end surfaces of the respective cylindrical rollers, and a second one of the outer race and the inner race is a flangeless bearing race having no flanges, wherein the retainer includes pillars defined between the respective adjacent pairs of the pockets, the retainer being configured such that the pillars are located between a pitch circle of the cylindrical rollers and the raceway of the flangeless bearing race and such that the pillars do not exist on the pitch circle of the cylindrical rollers, wherein at least one of the first flange and the second flange comprises a flange ring which is a separate member from, and fixed to, the flanged bearing race, and the flange ring is configured to be fixed to the flanged bearing race after fitting the cylindrical rollers in the flanged bearing race, wherein the flange ring is fixed to the flanged bearing race by a fixing arrangement comprising a fitting recess formed in an end surface of the flanged bearing race and configured such that the flange ring can be press-fitted in the fitting recess, and wherein an annular groove is formed in the end surface of the flanged bearing race.

14. The cylindrical roller bearing of claim 13, wherein the retainer has an outer diameter smaller than a pitch circle of the cylindrical rollers.

15. The cylindrical roller bearing of claim 14, wherein the outer diameter of the retainer is located between the pitch circle of the cylindrical rollers and the raceway of the flangeless bearing race.

16. The cylindrical roller bearing of claim 13, wherein the retainer has an inner diameter larger than a pitch circle of the cylindrical rollers.

17. The cylindrical roller bearing of claim 16, wherein the inner diameter of the retainer is located between the pitch circle of the cylindrical rollers and the raceway of the flangeless bearing race.

18. The cylindrical roller bearing of claim 13, wherein the retainer is configured such that a pitch circle diameter of the retainer is located between a pitch circle of the cylindrical rollers and the raceway of the flangeless bearing race.

\* \* \* \* \*